United States Patent [19]

Eisert et al.

[11] 3,927,095
[45] Dec. 16, 1975

[54] PRODUCTION OF AURAMINE SALTS AND AURAMINE SALT SOLUTIONS

[75] Inventors: Manfred Eisert, Ludwigshafen; Karl Schmeidl, Frankenthal, both of Germany

[73] Assignee: Badische Anilin- & Soda-Fabrik Aktiengesellschaft, Ludwigshafen (Rhine), Germany

[22] Filed: July 12, 1973

[21] Appl. No.: 378,775

[30] Foreign Application Priority Data
July 15, 1972 Germany............................ 2234836
Nov. 29, 1972 Germany............................ 2258344
Dec. 14, 1972 Germany............................ 2261064

[52] U.S. Cl. ........................ 260/566 R; 260/566 R
[51] Int. Cl.² ...................................... C07C 119/00
[58] Field of Search ................................ 260/566 R

[56] References Cited
UNITED STATES PATENTS
3,557,212   1/1971   Grosklos ........................ 260/566 R

*Primary Examiner*—Gerald A. Schwartz
*Attorney, Agent, or Firm*—Johnston, Keil, Thompson & Shurtleff

[57] ABSTRACT

Production of auramine salts and auramine salt solutions from 4,4'-bisdimethylaminodiphenylmethane or 4,4'-bisdiethylaminodiphenylmethane in the presence of sulfur and urea by reaction of the components, with or without the addition of an ammonium salt, taking up the auramine base in a solvent which is not miscible with water and extracting the auramine base by reaction with an acid in water, formamide or glycol with the formation of a salt. The auramine salts and auramine salt solutions obtained are outstandingly suitable for the production of dye liquors.

6 Claims, No Drawings

PRODUCTION OF AURAMINE SALTS AND AURAMINE SALT SOLUTIONS

The invention relates to a process for the production of auramine salts and auramine salt solutions by reaction of 4,4'-bisdimethylaminodiphenylmethane or 4,4'-bisdiethylaminodiphenylmethane with urea in the presence of sulfur and with or without the addition of an ammonium salt wherein if desired the auramine base is liberated, taken up in an organic solvent which is not miscible with water and the auramine base is extracted therefrom by reaction with an acid in water, formamide or glycol with the formation of a salt, the solvent not being miscible with formamide or glycol when these are used.

The process of the invention makes it possible to prepare auramine dye salts direct from crude auramine salt melts such as are obtained in the synthesis of the diphenylmethane compound on which they are based. Intermediate isolation of the crude auramine dye from the crude melt and the extraction of the pure dye (which is susceptible to hydrolysis) from the crude dye with a very large amount of water by the conventional method are no longer necessary.

In addition to the process of the invention being carried out more easily it has the advantages that the yields are higher, large volumes of materials and the requirement for voluminous boilers and tanks are avoided and there is a greatly decreased amount of waste water for disposal. It was further not to be expected that auramine salts prepared according to the invention would be of such high purity. Rather it would have been expected that the impurities, particularly compounds containing amino groups, extracted with the organic solvent from the crude melt would remain in the auramine and could be separated therefrom only by additional operations.

The process is particularly suitable for the production of ethylauramine salts and ethylauramine salt solutions.

Examples of ammonium salts which are suitable in the reaction of the invention are: ammonium chloride, ammonium sulfamate and preferably ammonium sulfate. Acids, for example sulfuric acid, sulfanilic acid, sulfamic acid and toluenesulfonic acid may be used instead of the ammonium salts. The acids are converted in the reaction mixture by ammonia into the ammonium salts.

The components are reacted with one another in the usual proportions and under the conventional reaction conditions. The hot melt, which is preferably still flowable, is then for example poured into an aqueous alkaline solution which conveniently already contains the organic water-immiscible solvent. The amount of alkali should be such that the whole of the methylauramine salt of ethylauramine salt formed in the reaction is converted into the base and the pH of the suspension is more than 8. The amount of solvent should be sufficient to take up the liberated methylauramine base or ethylauramine base. The acid is preferably used in a stoichiometric amount to extract the base from the solvent.

Examples of substances for use in converting the salt into the base are alkaline earth metal hydroxides, alkali metal carbonates, ammonia and preferably an alkali metal hydroxide, particularly caustic soda solution.

For taking up the auramine base there may be used for example an aliphatic or aromatic hydrocarbon or halohydrocarbon or a water-immiscible alcohol or ketone. Specific examples are benzene, toluene, xylene, methylene chloride, chloroform, carbon tetrachloride, trichloroethylene or chlorobenzene and particularly tetrachloroethylene.

Suitable acids include those capable of forming salts with auramine bases; examples, in addition to sulfuric acid, are hydrochloric acid, formic acid, acetic acid, propionic acid, α-chloropropionic acid, methylsulfuric acid or ethylsulfuric acid. The acids may be used mixed with water, formamide or glycols such as ethylene glycol, diethylene glycol, triethylene glycol or propylene glycol.

A particularly convenient method consists in heating a mixture of 4,4'-bisdimethylaminodiphenylmethane or 4,4'-bisdiethylaminodiphenylmethane, sulfur, urea and ammonium sulfate for from 4 to 6 hours at about 150° to 180°C while mixing well, then stirring the melt while it is still hot into a mixture of dilute caustic soda solution and tetrachloroethylene and separating the aqueous phase after extraction of the base. A solution of the auramine base in tetrachloroethylene is thus obtained from which the auramine salt can be recovered by reaction with an acid.

For example the dye chloride may be prepared by adding to the solution of the auramine base in the organic solvent an amount of water adequate for dissolving the salt at about 70°C, stirring well and adjusting the pH to about 5 for example by adding sulfuric acid, separating the organic phase and precipitating the dye chloride from the aqueous solution by adding common salt. A very pure product is obtained in a very good yield.

It is surprising that the impurities of the crude auramine bases do not cause any trouble at all; they remain in the tetrachloroethylene and are separated therewith.

Other auramine salts such as, for example, the nitrate, nitrite, benzenesulfonate or thiocyanate are also easily accessible in this way. For example if sodium thiocyanate is used instead of common salt for precipitating the dye, pure dye thiocyanate is obtained in a good yield.

It is also very surprising that stable highly concentrated solutions of auramine salts in organic solvents (such as glycol or formamide) can be prepared from solutions of crude contaminated auramine bases by a simple method. For this purpose for example glycol may be added to a solution of the auramine base in tetrachloroethylene until the desired dye concentration has been reached in the liquid formulation; then acid, for example concentrated sulfuric acid, is added while stirring, until the formation of the neutral sulfate has been concluded. The tetrachloroethylene phase is then separated and the glycol phase is freed from remainders of tetrachloroethylene at subatmospheric pressure or by introducing nitrogen or air. There is thus obtained for example a concentrated solution of auramine sulfate in glycol. Stability in storage is very good; the yields are more than 80%. It is further surprising that the impurities do not pass from the tetrachloroethylene phase into the glycol phase. Products of high purity are obtained from strongly contaminated auramine bases.

Examples of solvents for these concentrated dye solutions, other than ethylene glycol, are diethylene glycol, triethylene glycol, thiodiglycol, propylene glycol and formamide. It is preferred to use solvents having

EXAMPLE 1

62 parts of 4,4'-bisdiethylaminodiphenylmethane, 200 parts of urea, 20 parts of sulfur and 40 parts of ammonium sulfate are intensely stirred for 3 hours at 155°, 1 hour at 165°C and 1 hour at 175°C. The melt is then discharged into a mixture of 500 parts of water at 60°C, 75 parts of caustic soda solution (50%) and 240 parts of tetrachloroethylene. The whole is stirred for 15 minutes and the aqueous layer is then separated. The tetrachloroethylene phase is filtered and 500 parts of water at 70°C is added. A pH of 5 is set up by adding dilute sulfuric acid, the whole is stirred for fifteen minutes, the tetrachloroethylene phase is separated and the dye is precipitated by adding 30 parts of common salt. The whole is cooled, suction filtered and dried. 63.4 parts of dye is obtained with a content of ethylauramine of 60.2 parts. This is equivalent to a yield of 83.6%.

EXAMPLE 2

The procedure described in Example 1 is repeated but using 35 parts of sulfanilic acid instead of 40 parts of ammonium sulfate and using 250 parts of urea. The melt is poured into 800 parts of water, 75 parts of 50% caustic soda solution and 240 parts of tetrachloroethylene. After processing as described in Example 1, 63.1 parts of dye is obtained with a content of ethylauramine of 59.8 parts. This is equivalent to a yield of 83%.

EXAMPLE 3

The procedure described in Example 1 is repeated but the dye is precipitated with 25 parts of sodium thiocyanate instead of with common salt. The precipitate is suction filtered, washed with water and dried. 65.3 parts of ethylauramine thiocyanate is obtained; this is equivalent to a yield of 85.3%.

EXAMPLE 4

The procedure described in Example 1 is repeated but 64 parts of ethylene glycol is added instead of 500 parts of water to the filtered tetrachloroethylene phase and then concentrated sulfuric acid is added until a sample diluted with water has a pH of 5. The whole is stirred for thirty minutes and the tetrachloroethylene phase is separated and washed with 80 parts of tetrachloroethylene. Traces of this solvent are removed from the glycol phase by passing in nitrogen. 129 parts of an about 50% solution of ethylauramine in ethylene glycol is obtained.

EXAMPLE 5

62 parts of 4,4'-bisdimethylaminodiphenylmethane, 120 parts of urea, 23 parts of sulfur and 40 parts of ammonium sulfate are stirred successively for 3 hours at 155°C, 1 hour at 165°C and 1 hour at 175°C. The melt is then introduced into a mixture of 1000 parts of water at 60°C, 75 parts of caustic soda solution (50%) and 250 parts of trichloroethylene. Stirring is continued for another fifteen minutes and then the aqueous layer is separated. The trichloroethylene phase has 1000 parts of water at 70°C added to it. A pH of 5 is set up by adding dilute sulfuric acid, stirring is continued for another fifteen minutes, the trichloroethylene layer is separated and after the aqueous solution has been filtered the dye is precipitated by adding 60 parts of common salt. After cooling, the whole is suction filtered and dried. 73.2 parts of methylauramine chloride is obtained in a purity of 96% by weight.

EXAMPLE 6

The procedure described in Example 5 is followed but 400 parts of tetrachloroethylene is used instead of 250 parts of trichloroethylene and acetic acid is used instead of dilute sulfuric acid. 72.8 parts of methylauramine chloride is obtained in a purity of 95% by weight.

EXAMPLE 7

The procedure described in Example 5 is followed but 200 parts of methylisopropylketene is used instead of 250 parts of trichloroethylene. After the aqueous solution has been filtered the dye is precipitated in the form of the nitrate by adding 60 parts of sodium nitrate. After cooling the salt is suction filtered, washed with a small amount of water and dried. The yield is 74.8 parts in a purity of 98% by weight.

EXAMPLE 8

124 parts of 4,4'-bisdimethylaminodiphenylmethane, 260 parts of urea, 46 parts of sulfur and 80 parts of ammonium sulfate are reacted by heating at 170°C to form auramine sulfate. While it is still hot, the melt is discharged into a mixture of 4000 parts of water and 980 parts of tetrachloroethylene and 150 parts of 50% caustic soda solution is added. The aqueous phase is separated, the tetrachloroethylene phase is washed with 1000 parts of water, the water is again separated and the organic phase is filtered for clarification. The filtered solution has a layer of 124 parts of ethylene glycol poured onto it and 23.3 parts of 96% sulfuric acid is added. Upon dilution with water the solution of dye in glycol has a pH of about 4. The tetrachloroethylene is then separated and about 160 parts of tetrachloroethylene is added afresh, stirred and again separated.

272 parts of a dye solution is obtained which contains 11% of dissolved tetrachloroethylene. The tetrachloroethylene is completely removed by gassing with nitrogen.

The solution obtained remains completely clear when diluted with water.

We claim:

1. In a process for the production of methyl auramine or ethyl auramine or solutions thereof by reaction of 4,4'-bisdimethylaminodiphenylmethane or 4,4'-bisdiethylaminodiphenylmethane with urea in the presence of sulfur with or without the addition of an ammonium salt to form a crude auramine melt, the improvement which comprises:

liberating the free auramine base by drowning the crude melt in an aqueous alkaline solution;

taking up said auramine base in an organic water-immiscible solvent added to said aqueous alkaline solution used for drowning the crude melt; and extracting said solvent with an acid containing water, formamide or glycol with the formation of an auramine salt, said acid being selected from the group consisting of sulfuric acid, hydrochloric acid and a low molecular weight carboxylic acid and with the proviso that the solvent (when using the acid in formamide or glycol) is not miscible with the latter.

2. A process as claimed in claim 1 wherein caustic soda solution is used to liberate the auramine base.

3. A process as claimed in claim 1 wherein ammonium sulfate, chloride, sulfamate, sulfanilate or toluenesulfonate is used as the ammonium salt.

4. A process as claimed in claim 1 wherein trichloroethylene or perchloroethylene is used as the organic water-immiscible solvent.

5. A process as claimed in claim 1 wherein tetrachloroethylene is used as the organic water-immiscible solvent in the production of the auramine salt solution.

6. A process as claimed in claim 1 wherein perchloroethylene is used as the organic water-immiscible solvent and the auramine base is extracted with sulfuric acid or acetic acid in glycol.

* * * * *